United States Patent [19]

Neumann

[11] Patent Number: 4,519,975
[45] Date of Patent: May 28, 1985

[54] METHOD OF MANUFACTURE OF PLASTIC ARTICLE POSSESSING A WET APPEARANCE

[75] Inventor: Eberhard H. Neumann, Spartanburg, S.C.

[73] Assignee: American Hoechst Corporation, Somerville, N.J.

[21] Appl. No.: 516,838

[22] Filed: Jul. 25, 1983

[51] Int. Cl.³ ............................................. B29C 17/07
[52] U.S. Cl. .................................... 264/526; 264/520; 264/528; 264/532; 264/535; 428/35
[58] Field of Search ............... 264/523, 528, 532, 535, 264/537, 538, 540, 520, 526; 428/35, 910

[56] References Cited

U.S. PATENT DOCUMENTS

| Re. 28,497 | 11/1962 | Gasmire et al. | 264/28 |
| 2,348,738 | 5/1944 | Hoffmann | 18/55 |
| 3,127,458 | 3/1964 | Scott, Jr. et al. | 264/528 |
| 3,450,805 | 6/1969 | Chesser | 264/28 |
| 3,694,424 | 9/1972 | Hunkar et al. | 264/98 |
| 4,091,059 | 5/1978 | Ryder | 264/28 |
| 4,179,488 | 12/1979 | Nishikawa et al. | 264/521 |
| 4,192,843 | 3/1980 | Trieschock et al. | 264/528 |
| 4,244,913 | 1/1981 | Ryder | 264/348 |
| 4,255,381 | 3/1981 | Eustance et al. | 264/519 |
| 4,329,314 | 5/1982 | Jackson et al. | 264/519 |
| 4,379,188 | 4/1983 | Zimmerman et al. | 428/35 |
| 4,428,900 | 1/1984 | Riley et al. | 264/528 X |
| 4,473,515 | 9/1984 | Ryder | 264/28 |

Primary Examiner—Jan Silbaugh
Attorney, Agent, or Firm—James C. Lydon

[57] ABSTRACT

Plastic articles possessing a "wet" appearance, and a method for their manufacture, are disclosed. The "wet" appearance is achieved by injection of water in a parison prior to or simultaneous with expansion of said parison in an otherwise conventional blow molding operation.

9 Claims, 3 Drawing Figures

METHOD OF MANUFACTURE OF PLASTIC ARTICLE POSSESSING A WET APPEARANCE

BACKGROUND OF THE INVENTION

The present invention relates to plastic articles which possess a "wet" appearance. More particularly, the present invention relates to biaxially oriented plastic articles which possess a smooth outer surface and a grainy internal surface, which internal surface is responsible for the "wet" appearance of the plastic article.

Plastic articles, and particularly bottles, are typically manufactured by a multi-step process, in which the first step is typically an injection molding process in which a thermoplastic polymer is extruded under heat and pressure to form an inflatable cylindrical preform open at one end, which is typically termed a "parison". The parison is cooled to a temperature below the crystallization temperature range of the particular polymeric resin employed, and moved to a stretch blow molding station. The parison is reheated to an elastic state and the mold dies close. A blowing medium, typically air at superatmospheric pressure, is injected into the parison interior through a nozzle or a hollow stretch stick, thereby expanding the substantially amorphous polymeric material of the parison and forcing it to assume the shape of the mold. The parison polymeric material undergoes biaxial orientation during the blow molding expansion step just described. Once expanded, the polymeric material is cooled below its glass transition temperature, blowing medium pressure is removed, the mold dies open and the newly-formed article is removed from the mold. More specific information on this method of manufacture of thermoplastic articles, and particularly plastic bottles, may be found in "Hoechst Thermoplastic PET Resin Technical Bulletin No. 2," filed concurrently herewith, the disclosure of which is hereby incorporated by reference.

M. Nishikawa et al, "Method Of Making A Frosted Bottle Of Saturated Polyester," U.S. Pat. No. 4,179,488 (Dec. 18, 1979) discloses a method for frosting saturated polyester bottles by partial crystallization which comprises heating the outer surface of a polyester parison prior to the conventional stretch blow molding expansion step. The parison outer surface is heated to induce crystallization but the parison interior is not crystallized due to the temperature gradient across the thickness of the parison cylinder wall.

I. Jackson et al, "Method And Apparatus For Inside Frosting Of Tubing," U.S. Pat. No. 4,329,314 (May 11, 1982) discloses a process for uniform frosting of the interior surface of a plastic non-biaxially oriented tube, which is not formed by an injection stretch blow molding process. The frosting effect is achieved by uniform cooling of the inner die pin of an extrusion die assembly, thereby causing micro-cracks to develop in the inner surface of the tube. The disclosure is not limited to any particular thermoplastic polymer.

J. Eustance et al, "Textured Surface Polypropylene Film," U.S. Pat. No. 4,255,381 (Mar. 10, 1981) discloses a biaxially oriented polypropylene film having a hazy, uniformly textured surface on one side, and a smooth surface on the opposite side. The textured surface consists of intertwined fibers and craters. The hazy, uniformly textured surface effect is achieved by temperature control during otherwise conventional blown tube film manufacture to markedly increase the formation of Type III spherulite crystals. The hazy, textured film so produced has utility in electrical capacitors.

Cooling of newly-formed thermoplastic articles which have been formed by the stretch blow molding process described above is typically accomplished by internal cooling of the article prior to removal of blowing medium pressure and opening of the mold dies or sections. Various patents on methods to perform such internal cooling of the newly-formed article mention internal surface defects which were avoided or minimized by practice of the disclosed method. For example, G. Trieschock et al, "Method For Blow Molding Of Thermoplastic Articles," U.S. Pat. No. 4,192,843 (Mar. 11, 1980) discloses a prior art method of cooling a newly-formed article by application of water droplets onto the interior surface of the blown article. The water droplets are non-uniformly distributed, and were alleged to mar the interior walls of the formed article. Similarly, J. Chesser, "Process Of Cooling A Blown Article," U.S. Pat. No. 3,450,805 (June 17, 1969) discusses a prior art method of cooling the interiors of newly-formed articles which comprised circulating a cooling liquid within the interior of said articles. A problem alleged with this method was too rapid cooling of the interior surfaces, which was said to result in formation of blisters or stressed and warped areas due to the non-uniform contraction of the material during the cooling operation. R. Gasmire, "Method Of And Apparatus For Making A Plastic Article," U.S. Pat. No. Re. 28,497 (originally issued Nov. 27, 1962) discloses transparent and translucent polymer bottles with pitted interior surfaces, which were manufactured by a blow molding process which employed a gaseous refrigerant as the blowing medium.

It is clear from examination of the prior art discussed above that attainment of smooth internal surfaces of injection stretch blow molded articles was a goal of prior artisans, who regarded irregular internal surfaces as defects and a problem to be solved. Likewise, it is clear the present invention is both novel and unobvious to one of ordinary skill in the pertinent art.

SUMMARY OF THE INVENTION

The Applicant has discovered that "wet" biaxially oriented plastic articles may be manufactured by injection of a small amount of water into a parison prior to or simultaneously with expansion of the parison by the blowing medium. In one aspect, the invention is a method for the production of frosted articles comprising the injection of liquid water at a temperature of at least 33° F. into a parison prior to or during expansion of said parison in an otherwise conventional stretch blow molding process. In another aspect, the invention is an article of manufacture comprising a "wet" biaxially oriented article produced by the instant process.

DETAILED DESCRIPTION OF THE DRAWINGS

DETAILED DESCRIPTION OF THE INVENTION

Figure 1:
FIG. 1 is a scanning electron microscope photomicrograph, at 17 magnification, of the internal surface of the side wall or "panel" of a two liter polyethylene terephthalate bottle, which shows the grainy internal surface of the invention.

The Applicant has discovered that injection of a small amount of water into a parison prior to or simultaneously with expansion of the parison during an otherwise conventional stretch blow molding operation results in a plastic biaxially oriented article of manufacture with a grainy internal surface. Such an internal surface produces a "wet" overall appearance to the article, as if the article had been chilled and then exposed to normal room temperature, thereby causing water vapor to condense as droplets on the outside surface of the article. Such a "wet" appearance is commercially desirable for some applications.

While not intending to be bound by a particular theory of the invention, the Applicant believes the grainy internal surface is caused by the irregular cooling of the internal surface of the parison during expansion. The injected water undergoes vaporization and cooling during the expansion of the parison by the blowing medium. The water particles lower the temperature of portions of the parison internal surface as it is expanding. The portions of the parison internal surface so cooled are not as elastic as the uncooled portions of the parison internal surface, and are believed responsible for the grainy internal surface of the formed article.

The amount of water which should be injected into the parison will depend upon the size or capacity of said article. Two to seven milliliters of water at ambient temperature are sufficient to impart a noticable "wet" appearance to a two liter biaxially oriented polyethylene terephthalate bottle.

The water may be injected into the parison prior to or simultaneously with the blow molding gas expansion step. Water injection simultaneously with the gas expansion step is preferred due to the incremental energy cost associated with pre-expansion step water injection. Typically, the parison must be reheated and allowed to thermally equilibrate prior to the gas expansion step. The amount of reheating and equilibrium time will depend upon several factors, including the thickness of the parison sidewalls and the overall mass of the parison. If the water is injected into the parison prior to reheating and thermal equilibration (i.e. prior to the gas expansion step) the injected water will also be reheated and the thermal energy required to reheat and thermally equilibrate the parison will be increased.

The instant process should be operable with any thermoplastic polymer typically employed in the manufacture of biaxially oriented plastic articles. Polymers of particular interest include the polyesters, the polycarbonates, the polystyrenes, thermoplastic copolymers of acrylonitrile and thermoplastic copolymers of vinyl chloride.

WORKING EXAMPLES

The Examples discussed below illustrate the advantages inherent in the practice of the present invention. As Examples, they are intended to be illustrative only, and should not be construed to limit the allowable scope of protection available to the Applicant in any way.

EXAMPLE I

Several 66 gram parisons were formed on a Type 2500 Cincinnati Milacron Injection Molding Machine. The parisons were formed from commercially available Hoechst polyethylene terephthalate bottle resin Type M 91. The characteristic properties of this resin are set out in Table I below:

TABLE I

| Hoechst PET Bottle Resin Type M 91 | |
|---|---|
| Bulk Density | 55 lbs/ft$^3$ (approx.) |
| Intrinsic Viscosity | 0.74 dl/g |
| Diethylene Glycol Content | 2.0 wt. % |
| Acetaldehyde Content | 2.0 PPM (max.) |
| Carboxyl Terminal Groups | 28 meq/k (max.) |
| Crystallinity | 55 % (approx.) |
| Specific Gravity | 1.39 g/cm$^3$ |
| Melting Point | 253 ° C. (approx.) |

The parisons were allowed to cool and were each injected with approximately 5 milliliters of water at room temperature.

The parisons were then placed on the parison holders of a RHB-L stretch blow molding machine, manufactured by Cincinnati Milacron's Plastic Machinery Division. After reheating the parisons to their thermoelastic temperature of approximately 90° C., and allowing the heated parison to thermally equilibrate for 20 seconds, the parisons were each individually placed between open mold dies, the mold halves closed, and the parison inflated by expansion of a gas [250 psig air pressure] to the final shape of the mold (a two liter bottle). Cooling of the newly formed article prior to ejection from the mold was accomplished through thermal conduction by contact with the mold.

The biaxially oriented plastic bottles produced by the above described method displayed a noticeable non-uniform "wet" appearance.

EXAMPLE II

Using the procedure of Example I, several two liter polyethylene terephthalate bottles were stretch blow molded with the exception that various amounts of water were injected into the parisons prior to blow molding. The biaxially oriented plastic bottles produced by the above described method displayed a noticeable non-uniform "wet" appearance to varying degree. Three representative samples of the bottles exhibiting (1) a low, (2) a medium, and (3) a high degree of the "wet" appearance were examined microscopically to characterize the deformation of the inner bottle wall that causes the "wet" appearance effect. The samples were examined using a light microscope under both transmitted and reflected light. Lateral dimensions were measured with the eyepiece scale of the microscope, perpendicular dimensions were determined by using the fine focusing rack and pinion drive of the sample stage. Characteristic dimensions of the surface deformations examined on these samples are listed in Table II below.

It was found that in all three samples the typical deformation of the inner bottle wall that causes the "wet" appearance is a spherical segment of varying diameter and height rising from the inner bottle wall surface. In areas of mainly unilateral or heterogenous deformation of the parison this segment can be highly elongated; oval shaped deformations with a width to length ratio of up to one to six have been observed. As shown in Table II the average base diameter (d) of the spherical segments and its range are not significantly different for the three samples investigated. Differences were observed in the height (Table II) and the surface density (FIGS. 1, 2, and 3) of the segments. The degree of apparent "wetness" increases as either one of these parameters increases.

TABLE II

CHARACTERISTIC DIMENSIONS OF SURFACE DEFORMATIONS (μm)

| Sample | Amount of Water Injected | d* | d max* | h** | h max** |
|---|---|---|---|---|---|
| E | 2 ml | 240 | 250 | 4 | 10 |
| D | 2 ml | 230 | 265 | 15 | 35 |
| A | 5 ml | 235 | 290 | 22 | 40 |

*measured under reflected light
**measured under transmitted light

Figure 2:
FIG. 2 is a scanning electron microscope photomicrograph, at 17 magnification, of the internal surface of the neck region of a two liter polyethylene terephthalate bottle, which shows the grainy internal surface of the invention.
Figure 3:
FIG. 3 is a scanning electron microscope photomicrograph, at 17 magnification, of the internal surface of the neck region of a two liter polyethylene terephthalate bottle which shows the grainy surface of the invention.

The samples were then examined using a scanning electron microscope at 17 magnification after first being metallized with gold-palladium using a "Hummer" sputterer manufactured by Technics, Inc. FIG. 1 is a scanning electron microscope photomicrograph, at 17 magnification, of the internal surface of the side wall or "panel" of a two liter polyethylene terephthalate bottle denominated "Sample E." FIG. 2 is a scanning electron microscope photomicrograph, at 17 magnification, of the internal surface of the neck region of a two liter polyethylene terephthalate bottle, denominated "Sample D." FIG. 3 is a scanning electron microscope photomicrograph, at 17 magnification, of the internal surface of the neck region of a two liter polyethylene terephthalate bottle, denominated "Sample A."

I claim:

1. A process for the production of biaxially oriented plastic articles possessing a "wet" appearance comprising injecting a small amount of water effective to produce said "wet" appearance, at a temperature of at least 33° F. into a parison prior to or simultaneously with expansion of said parison in an otherwise conventional stretch blow molding process.

2. The process of claim 1 wherein the water is injected prior to expansion of said parison.

3. The process of claim 1 wherein the water is injected simultaneously with expansion of said parison.

4. The process of claim 2 wherein said parison is made from a polymer selected from the group of thermoplastic polymers consisting of polycarbonates, polyesters, polystyrenes, thermoplastic copolymers of acrylonitrile, and thermoplastic copolymers of vinyl chloride.

5. The process of claim 3 wherein said parison is made from a polymer selected from the group consisting of thermoplastic polymers consisting of polycarbonates, polyesters, thermoplastic copolymers of acrylonitrile, polystyrenes, and thermoplastic copolymers of vinyl chloride.

6. The process of claims 4 or 5 wherein said parison comprises polyethylene terephthalate.

7. A process for manufacture of a biaxially oriented article having a "wet" appearance comprising:
(a) heating a substantially amorphous, thermoplastic parison to a temperature within its thermoelastic temperature range,
(b) placing said heated parison in a mold,
(c) introducing a blowing medium at superatmospheric pressure into the interior of said heated parison, thereby expanding said parison to the shape of the mold to produce a biaxially oriented article of manufacture,
(d) prior to or during the biaxial orientation of the parison material during said expansion of said parison in step (c) above, introducing into the parison interior a small amount of water effective to produce a "wet" appearance in said biaxially oriented article of manufacture,
(e) after biaxial orientation of said parison material is complete, cooling the resulting article of manufacture to a temperature below the glass transition temperature of the material comprising said article of manufacture,
(f) substantially reducing the blowing medium superatmospheric pressure within said article of manufacture,
(g) removing said article of manufacture form the mold.

8. A process for manufacture of a biaxially oriented article having a "wet" appearance consisting essentially of:
(a) heating a substantially amorphous, thermoplastic parison to a temperature within its thermoelastic range,
(b) placing said heated parison in a mold,
(c) introducing a blowing medium at superatmospheric pressure into the interior of said heated parison, thereby expanding said parison to the shape of the mold to produce a biaxially oriented article of manufacture,
(d) prior to or during the biaxial orientation of the parison material during the expansion of said parison in step (c) above, introducing into the parison interior a small amount of water effective to produce a "wet" appearance in said biaxially oriented article of manufacture,
(e) after biaxial orientation of said parison is complete, cooling the resulting article of manufacture to a temperature below the glass transition temperature of the material comprising said article of manufacture,
(f) substantially reducing the blowing medium's superatmospheric pressure within said article of manufacture,
(g) removing said article of manufacture from the mold.

9. A process for manufacture of a biaxially oriented article having a "wet" appearance consisting of:
(a) heating a substantially amorphous, thermoplastic parison to a temperature within its thermoelastic temperature range,
(b) placing said heated parison in a mold,
(c) introducing a blowing medium at superatmospheric pressure into the interior of said heated parison, thereby expanding said parison to the shape of said mold to produce a biaxially oriented article of manufacture,
(d) prior to or during the biaxial orientation of the parison material during said expansion of said parison in step (c) above, introducing into the parison interior a small amount of water effective to produce a "wet" appearance in said biaxially oriented article of manufacture,
(e) after biaxial orientation of said parison material is complete, cooling the resulting article of manufacture to a temperature below the glass transition temperature of the material comprising said article of manufacture,
(f) substantially reducing the blowing medium superatmospheric pressure within said article of manufacture,
(g) removing said article of manufacture from the mold.

* * * * *